United States Patent
Nielsen et al.

(10) Patent No.: US 7,255,825 B2
(45) Date of Patent: Aug. 14, 2007

(54) MATERIALS AND METHODS FOR FREEFORM FABRICATION OF SOLID THREE-DIMENSIONAL OBJECTS USING FUSIBLE, WATER-CONTAINING SUPPORT MATERIALS

(75) Inventors: Jeffrey A. Nielsen, Corvallis, OR (US); Vladek Kasperchik, Corvallis, OR (US); Laura Kramer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 10/797,789

(22) Filed: Mar. 10, 2004

(65) Prior Publication Data

US 2005/0200039 A1    Sep. 15, 2005

(51) Int. Cl.
*B29C 35/08* (2006.01)
*B29C 41/02* (2006.01)
*B29C 71/02* (2006.01)

(52) U.S. Cl. ............... 264/494; 264/236; 264/308; 264/317

(58) Field of Classification Search ............... 264/40.7, 264/308, 221, 317, 236, 494
See application file for complete search history.

(56) References Cited

U.S. PATENT DOCUMENTS 5,072,770 A    12/1991  Yodice
6,253,116 B1 *  6/2001  Zhang et al. ............... 700/119
6,437,034 B2 *  8/2002  Lombardi et al. ........... 524/425
6,936,212 B1 *  8/2005  Crawford .................... 264/308

OTHER PUBLICATIONS

Objet, PolyJet 2nd Generation Technology, http://www.objet.co.il/Tech, 6 pages (2003).
Objet, The Eden 330 Rapid Prototyping Systems, http://www.objet.co.il/Products/eden330, 4 pages (2003).
Objet, Objet QuadraTempo, 3d Rapid Prototyping Inkjet System, 2 pages (2001).
Objet, Objet FullCure 700 Series, http://www.objet.co.il/Products/fc700, 4 pages (2003).
Objet, Objet FullCure510 Series, http://www.objet.co.il/Products/fc510, 1 page (2003).
Object, Objet Studio Software, http://www.objet.co.il/Products/software, 1 page (2003).
Fused Deposition Modeling, http://home.att.net/—castleisland/fdm_int.htm, 2 pages, Jul. 21, 2003.
Inkjets, http://home.att.net/—castleisland/ , 4 pages, Aug. 27, 2003.

* cited by examiner

*Primary Examiner*—Leo B. Tentoni

(57) ABSTRACT

Materials and methods for freeform fabrication of a solid three-dimensional object are provided. At least one layer of support material and at least one layer of build material are dispensed onto a substrate. The support material includes at least one of water and a fusible water-containing substance and the build material is a substance other than water or a fusible, water-containing substance. After solidification, the at least one layer of support material is removed by an automated or manual process which includes washing with water at ambient temperature and/or causing the support material to undergo a phase change, to produce the solid three-dimensional object.

13 Claims, No Drawings

MATERIALS AND METHODS FOR FREEFORM FABRICATION OF SOLID THREE-DIMENSIONAL OBJECTS USING FUSIBLE, WATER-CONTAINING SUPPORT MATERIALS

FIELD OF THE INVENTION

The present invention relates to materials and methods for freeform fabrication of solid three-dimensional objects. More specifically, the present invention relates to fabrication of solid three-dimensional objects using water or a fusible, water-containing support material in conjunction with a build material that is free of water or a fusible, water-containing substance.

BACKGROUND OF THE INVENTION

Solid freeform fabrication (SFF), also known as rapid prototyping, is a designation for a group of fabrication technologies that produce three-dimensional objects using additive formation steps without the use of part-specific tooling (e.g., molds or dies). The three-dimensional object is commonly produced from a three-dimensional representation devised using Computer Aided Design (CAD). The three-dimensional representation is a layer-by-layer slicing of the object into consecutive two-dimensional layers which may be fabricated and accrued to produce the three-dimensional object. SFF has been used to create, for example, prototypes or functional final products in a variety of industries, including the aerospace, electronics, medical, dental, architecture, archeology, and biomedical engineering fields.

Exemplary fabrication techniques encompassed by the "rapid prototyping" designation include techniques which involve the use of lasers to solidify successively bound layers of photopolymer (e.g., stereolithography), and techniques which involve the use of $CO_2$ lasers to fuse layers of powdered build and support materials or etch patterns into polyethylene-coated paper materials (e.g., selective laser sintering and laminated object manufacturing, respectively). Other fabrication techniques include, for example, techniques wherein a binder is deposited into a layer of powdered material to form each successive layer of build material, while the unbound powder acts as the support material (e.g., 3-D printing) and techniques involving bulk-jetting build and support materials from inkjet print-heads or other suitable dispensing mechanisms (e.g., fused deposition modeling and thermal phase change and photopolymer phase change inkjet technologies).

Materials that may be used for the fabrication of build supports in bulk-jetting SFF systems, that do not require mechanical or harsh chemical removal, that are non-hazardous, and which may be used in thermal inkjet methods would be advantageous. Further, methods for fabricating solid three-dimensional objects that make use of build supports that utilize environmentally benign materials for the fabrication of such build supports would be desirable. Use of build supports that may be safely and easily removed would also be desirable.

BRIEF SUMMARY OF THE INVENTION

The present invention provides a method for freeform fabrication of a solid three-dimensional object, which may optionally include the use of a build support. A particular embodiment of the method comprises dispensing at least one layer of support material, which includes water and/or a fusible, water-containing substance, onto a substrate and solidifying the layer to produce the build support. The method may further comprise dispensing at least one layer of build material, which is a substance other than water or a fusible, water-containing substance, onto a substrate and solidifying the layer The present invention further provides an intermediate structure in the freeform fabrication of a solid three-dimensional object, which includes use of a build support. The intermediate structure comprises at least one layer of a support material having water and/or a fusible, water-containing substance, and at least one layer of a build material other than water or a fusible, water-containing substance.

Other features and advantages of the present invention will become apparent to those of ordinary skill in the art through consideration of the ensuing description and the appended claims.

DETAILED DESCRIPTION OF THE INVENTION

The present invention is directed to materials and methods for freeform fabrication of solid three-dimensional objects. More specifically, the present invention is directed to the fabrication of solid three-dimensional objects using water or a fusible, water-containing material for the fabrication of build supports in conjunction with a build material, which is other than water or a fusible, water-containing substance. The particular embodiments described herein are intended in all respects to be illustrative rather than restrictive. Other and further embodiments will become apparent to those of ordinary skill in the art to which the present invention pertains without departing from its scope.

The present invention describes the use of a bulk-jetting solid freeform fabrication (SFF) system for the production of a solid three-dimensional object having at least one feature requiring the use of a build support. As used herein, the term "solid three-dimensional object," "three-dimensional object," or "object" refers to objects formed by the bulk-jetting SFF techniques of the present invention. Solid three-dimensional objects are typically sufficiently rigid to maintain a fixed volume and shape to an extent that is appropriate for use in three-dimensional modeling (e.g., exhibiting substantially no perceptible flow at room temperature). It will be understood and appreciated by those of ordinary skill in the art that the term may include states of the three-dimensional object before and after the object has completely solidified. In this regard, when dispensing a layer of build and/or support material over a previously solidified layer, the previously solidified layer is typically not fully solidified to provide good adhesion with the subsequently dispensed layer.

Solid three-dimensional objects often include complex geometries having features such as overhangs and undercuts, which may be supported during fabrication by build supports. The build supports of one embodiment of the present invention may be fabricated from a support material comprising at least one of water and a fusible, water-containing (FWC) substance. By way of example and not limitation, FWC substances may include brine, which is a mixture of water and salt and which has a lower freeze temperature than pure water, and fusible crystal hydrates having high water content and relatively high freeze temperatures. Exemplary fusible crystal hydrates may include, among others, sodium sulfate decahydrate, sodium acetate trihydrate, sodium aluminum sulfate dodecahydrate, sodium carbonate decahydrate, sodium phosphate dodecahydrate and potassium aluminum sulfate dodecahydrate. Typically, the fusible, water-containing substances of the present invention may be inorganic. However, some such substances (e.g., some fusible crystallohydrates) may be partially organic (i.e., having an inorganic cation and an organic anion). One such substance (which, although not formally considered organic, is a salt of an organic acetic acid) is sodium acetate. Fusible, water-containing substances are generally environmentally benign and, thus, build supports fabricated from such materials may be non-toxic and capable of being handled without special treatment subsequent to fabrication.

Build materials for use in the bulk-jetting SFF systems of the present invention may be any substance other than water or a fusible, water-containing substance. Exemplary build materials include, by way of example only, waxes, polymers, pre-polymers, and combinations thereof. Exemplary fusible waxes include, but are not limited to, hydrocarbon waxes (e.g., fusible aliphatic and unsaturated hydrocarbons), polyethers (e.g., polyethylene glycols and polypropylene glycols), fusible esters of fatty long-chain carboxylic acids, esters of fatty long-chain alcohols, and the like. Exemplary pre-polymers and jettable low molecular weight polymers (oligomers) include, but are not limited to low molecular weight monofunctional alkyl acrylates and alkyl methacrylates (e.g., allyl methacrylate, isodecyl acrylate, methacrylate, and isooctyl acrylate), hydroxyalkyl acrylates and methacrylates (e.g., 2-hydroxyethyl methacrylate), glycidyl methacrylate, isobornyl acrylate, and the like; low molecular weight monofunctional acrylates and methacrylates (including, by way of example only, 1,4-butanediol diacrylate, 1,4-butanediol dimethylacrylate, 1,6-hexamethylene glycol diacrylate, neopentyl glycol dimethacrylate, trimethylol propane trimethacrylate, pentaerythritol triacrylate pentaerythritol trimethacrylate triethylene glycol triacrylate, triethylene glycol trimethacrylate, urethane acrylate, trimethylol propane triacrylate, and urethane methacrylates); and vinyl ether monomer and oligomers having at least one vinyl ether group. Exemplary vinyl ethers include, but are not limited to, ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether, and 1,4 cyclohexane dimethanol divinyl. The build material may also include chemicals having one or more epoxy substituents such as, but not limited to, epoxy monomers and oligomers having at least one oxirane moiety. Examples of epoxy-containing build materials include, but are not limited to, bis-(3,4 cyclohexylmethyl), 3,4-epoxy cyclohexylmethyl, 3,4-epoxycyclohexyl carboxylate, diglycidyl ether vinylcyclohexene, 1,2 epoxy-4-vinylcyclohexane, 2,4-epoxy cyclohexylmethyl, 3,4-epoxy cyclohexane carboxylate, and the like. It is currently preferred that the build material includes chemicals such as, by way of example only, acrylates and derivatives thereof, epoxy acrylates and derivatives thereof, urethane acrylates and derivatives thereof, norbornenes and derivatives thereof, and combinations thereof.

The build and/or support materials of the present invention may be dispensed from a suitable dispensing mechanism and can be solidified layer-upon-layer onto a substrate to fabricate a three-dimensional object one cross-section at a time. As used herein, the term "substrate" may include a build platform, a removable material supported by a build platform, or a previously dispensed and solidified layer of build or support material, depending on the context (e.g., stage of processing).

A suitable dispensing mechanism may include, but is not limited to, conventional inkjet technologies, such as drop-on-demand and continuous flow inkjet technologies, and conventional fused deposition modeling (FDM) technologies, that may be used to dispense or extrude one or more materials (e.g., build materials and support materials), as more fully described below. As used herein, the term "dispense," "dispensed," or "dispensing" encompasses all such dispensing and extrusion technologies. The dispensing mechanism may include at least one conventional inkjet print-head (e.g., a thermal inkjet print-head, a piezoelectric inkjet print-head, a continuous inkjet print-head, and/or an electrostatic inkjet print-head) configured to dispense one or more build and/or support materials through one or more of a plurality of inkjet print-head dispensers. For instance, in one embodiment, the dispensing system may include one or more inkjet print-heads for containing and dispensing each of the build material and the support material. In another embodiment, a single inkjet print-head may include a plurality of inkjet compartments, e.g., tanks or wells, which are configured to independently contain one or more of the support and/or build materials of the present invention, each inkjet compartment being operatively coupled to one or more independent inkjet dispensers. In another embodiment, the build and/or support materials of the present invention may be extruded from a FDM head. In yet another embodiment, a FDM head may be used to extrude the build material and an inkjet print-head may be used to dispense the FWC support material. All such combinations are contemplated to be within the scope hereof.

As used herein, the term "solidifying" or "curing" refers to the reactive process that occurs after exposure of the dispensed build and/or support materials of the present invention to a suitable curing system, e.g., a source of ultra-violet radiation, a thermally-controlled fabrication chamber, or a chemical curing agent, i.e., any agent that is capable of reacting with the build and/or support material to form a layer of solidified material. It will be understood by those of ordinary skill in the art that a state of solidification would include when the build and support materials of the present invention are in various states of partial solidification. Solidification may occur from the precise moment of exposure of the build and/or support materials to the curing system. The term "curing," "cure," or the like, is not intended to imply that the resulting composition is necessarily a hard substance in the traditional sense. For example, the build materials of the present invention may be cured to form a three-dimensional object which is mechanically flexible.

Using the materials and methods of the present invention, a solid three-dimensional object may be fabricated with bulk-jetting SFF techniques utilizing build supports which may be removed from the object upon completion of fabrication by an automated or manual removal process that does not employ toxic or environmentally detrimental solvents. More particularly, the build supports may be removed by washing the three-dimensional object with water at ambient temperature or by causing the build support to undergo a phase change, e.g., increasing the temperature of the object causing the build support to simply melt away. In some cases, for instance, if the build support is fabricated from a fusible crystal hydrate, removal of the build supports by causing them to undergo a phase change may leave behind a salty residue on the three-dimensional object. Solubility of fusible crystal hydrates in water is generally extremely high and, accordingly, subsequent rapid contact with an aqueous environment may be sufficient to remove the residue.

Further, the support materials of the present invention may readily and easily convert between solid and liquid states under the appropriate conditions. Accordingly, once melted away, the material of the build supports may be reused in a subsequent SFF build.

Still further, the support materials of the present invention may be formulated to be dispensed from a thermal inkjet print-head, if desired. As thermal inkjet print-heads are often times less expensive than other conventional alternatives, this can significantly decrease the costs of fabrication.

In another embodiment, the present invention provides a method for freeform fabrication of a solid three-dimensional object having at least one feature requiring the use of a build support. In fabricating a solid three-dimensional object according to the method of the present invention, the build and/or support materials may be dispensed from a suitable dispensing mechanism onto a substrate. The substrate may be, for instance, a build platform, a removable material supported by a build platform, or a layer of previously solidified build and/or support material. The build platform may be any conventional platform known to those of ordinary skill in the art and may include a rigid platform that can be used to support the solid three-dimensional object as it is formed. The removable material is optional and may, if desired, be utilized to separate the solid three-dimensional object, once formed, from the build platform. The removable material may be a wax, a water-swellable gel, a readily meltable material, a readily soluble material, or any suitable material that can carry the solid three-dimensional object being built, as well as be configured to be readily removed. The removable material may be applied by an inkjet print-head or other deposition technique, as known to those of ordinary skill in the art, and may be used not only to separate the solid three-dimensional object from the build platform, but also may be applied to support overhang features of the solid three-dimensional object. In this regard, the removable material may be the same as the support material.

The dispensing mechanism may include, but is not limited to, conventional inkjet technologies (e.g., drop-on-demand and continuous flow inkjet technologies, and conventional fused deposition modeling technologies) that may be used to dispense one or more materials (e.g., build materials and support materials). In one embodiment, the dispensing mechanism may include at least one conventional inkjet print-head (e.g., a thermal inkjet print-head, a piezoelectric inkjet print-head, a continuous inkjet print-head, and/or an electrostatic inkjet print-head) configured to dispense one or more build and/or support materials through one or more of a plurality of inkjet print-head dispensers. In another embodiment, the dispensing mechanism may include at least one FDM head configured for extrusion of one or more build and/or support materials.

In one embodiment, each of the build and support materials may be substantially simultaneously dispensed onto the same substrate. In another embodiment, the build and support materials may be dispensed and solidified sequentially, one solidified layer providing the substrate for a subsequently dispensed layer of build or support material.

The layer of build and/or support material may subsequently be exposed to a suitable curing system, e.g., a source of ultraviolet radiation, a thermally-controlled fabrication chamber, or a chemical curing agent, to initiate curing thereof.

A plurality of layers of solidified build and support material may subsequently be accrued, one upon another, to form a solid three-dimensional object. Once at least one layer of solidified build or support material has been fabricated, the layer of solidified material may comprise the substrate for a subsequently fabricated layer. When dispensing a layer of build or support material upon a substrate having the previously solidified material layer, the previously solidified layer is preferably not fully solidified in order to provide improved adhesion with the subsequently dispensed layer.

Once the desired number of layers of build and support material have been dispensed and solidified, the build supports may be removed. More particularly, the build supports may be removed by washing the three-dimensional object with water at ambient temperature or by causing the build support to undergo a phase change, e.g., increasing the temperature of the object causing the build support to simply melt away. If the build support is fabricated from a fusible crystal hydrate, removal of the build supports by way of a phase change may leave behind a salty residue on the three-dimensional object. This residue may be subsequently washed away with water.

Intermediate structures in the fabrication of solid three-dimensional objects, which may optionally include at least one feature requiring the use of a build support, are also provided by the present invention. The intermediate structures may comprise at least one layer of a support material comprising at least one of water and a fusible, water-containing substance and at least one layer of a build material which is other than water or a fusible water-containing substance.

In one exemplary embodiment, water may be utilized as the support material in a bulk-jetting SFF technique in conjunction with a build material comprising at least one of a wax, a polymer, or a pre-polymer. In this embodiment, the build and support materials may be dispensed from one or more inkjet print-heads (or extruded from one or more FDM heads) into a thermally-controlled fabrication chamber having a temperature less than 0° C. Once the water has been dispensed into the fabrication chamber, it will turn to ice, thus producing the necessary build supports. Once the fabrication of a solid three-dimensional object is complete, the temperature inside the thermally-controlled fabrication chamber may be raised to above 0° C., causing the build support to simply melt away.

It should be noted that if a pre-polymer is used as the build material in the above-described embodiment, the pre-polymer may give off energy in an exothermic polymerization reaction. As some of the pre-polymer will be in direct contact with the water/ice support material, precise thermal management of the system will be necessary. Additionally, if the pre-polymer is curable via ultraviolet (UV) radiation, use of an infrared (IR) filter may be desirable. That is, many UV sources (e.g., bulbs) have a fairly broad spectrum that include IR radiation. Infrared radiation is absorbed quite readily by water/ice and, thus, it may be desirable to use an IR filter with the UV source to prevent unintentional re-melting of the support material.

In another embodiment, a fusible, water-containing support material may be utilized, which comprises a fusible crystal hydrate. Fusible crystal hydrates undergo a phase change from solid to liquid (i.e., melt) usually at higher than ambient temperatures (typically between 20° C. and 120° C., depending upon the substance). This presents an advantage over the use of water/ice supports as thermal management of the system may be simpler. Typically, upon melting, fusible crystal hydrates turn into aqueous solutions of the salts from which they are formed. The water content in these solutions is typically high enough to generate drive bubbles upon further heating and, hence, makes the solutions capable of being jetted from a thermal inkjet print-head. The melting process is reversible and material dispensed in a liquid state readily solidifies upon cooling. While these materials typically are bitter or salty to the taste, they are generally not hazardous to touch. Accordingly, fusible crystal hydrates may be safely utilized in the fabrication of build supports.

Currently preferred fusible crystal hydrates that may be used in the methods of the present invention include, by way of example only, sodium sulfate decahydrate, having a freeze temperature of approximately 30° C., and sodium acetate trihydrate, having a freeze temperature of approximately 58° C. Sodium acetate trihydrate is less likely to undergo solid-to-liquid phase changes after solidifying due to its higher freeze temperature. Thus, build supports fabricated from sodium acetate trihydrate may be more robust to exothermic temperature excursions as part of a build-material polymerization process.

Other examples of fusible crystal hydrates with high water content and higher than ambient melting temperatures which may be used in the methods of the present invention include, but are not limited to, sodium aluminum sulfate dodecahydrate ($NaAl(SO_4)_2 \times 12H_2O$), which has a melting temperature of approximately 60° C., sodium carbonate decahydrate ($Na_2CO_3 \times 10H_2O$), which has a melting temperature of approximately 34° C., sodium phosphate dodecahydrate ($Na_3PO_4 \times 12H_2O$) which has a melting temperature of approximately 75° C., and potassium aluminum sulfate dodecahydrate ($KAl(SO_4)_2 \times 12H_1 O$), which has a melting temperature of approximately 100° C.

The following examples describe the use of exemplary FWC support materials in conjunction with non-FWC build materials in the fabrication of three-dimensional objects using a bulk-jetting SFF technique in accordance with the present invention. The examples are merely illustrative and are not meant to limit the scope of the present invention in any way.

EXAMPLES

Example 1

Sodium Sulfate Decahydrate as a Support Material

A solid freeform fabrication system capable of separately containing and dispensing (i.e., bulk-jetting) at least two materials onto a build platform, each material being dispensed from one or more material dispensers, is utilized. A first material is a build material comprising allyl methacrylate. A second material, or support material, is sodium sulfate decahydrate. Sodium sulfate decahydrate has a melting temperature of approximately 30° C.

The build and support materials are dispensed, layer-upon layer, onto a build platform to form a solid three-dimensional object having at least one feature requiring the use of a build support. A first inkjet print-head is heated to a temperature above 30° C. to melt the sodium sulfate decahydrate to a liquid state prior to dispensing. The sodium sulfate decahydrate is dispensed onto the build platform (or a previously dispensed layer of build or support material, depending on the stage of fabrication), which is contained in a thermally-controlled fabrication chamber having a temperature below 30° C., such that the sodium sulfate decahydrate is solidified after being dispensed.

A second inkjet print-head is used as the material dispenser containing and dispensing the build material. Once dispensed, the build material is polymerized and is solidified by exposure thereof to an energy source, such as a UV lamp.

Once all desired layers of build and support materials are dispensed, one upon another, and cured, the solid three-dimensional object is heated to a temperature above 30° C. for a period of time sufficient to permit the build supports to be melted away. Because the sodium sulfate decahydrate may leave a residue or film behind, the object may then be subjected to an aqueous wash in water at ambient temperature. (Sodium sulfate residue is highly soluble in water.)

Example 2

Sodium Acetate Trihydrate as the Support Material

A bulk-jetting SFF system as described in Example 1 is utilized. A build material comprising allyl methacrylate is provided as a first material. Sodium acetate trihydrate is provided as a second material or support material. Sodium acetate trihydrate has a melting temperature of approximately 58° C.

The build and support materials are dispensed, layer-upon layer, onto a build platform to form a solid three-dimensional object having at least one feature requiring the use of a build support. A first inkjet print-head heated to a temperature above 58° C. is provided to melt the sodium acetate trihydrate to a liquid state prior to dispensing. The sodium acetate trihydrate is dispensed onto the build platform (or a previously dispensed layer of build or support material, depending on the stage of fabrication), which is contained in a thermally-controlled fabrication chamber having a temperature below 58° C. such that the sodium acetate trihydrate solidifies after being dispensed.

A second inkjet print-head is provided as the material dispenser containing and dispensing the build material. Once dispensed, the build material is polymerized and solidified by exposure thereof to an energy source, such as a UV lamp.

Once all desired layers of build and support materials are dispensed, one upon another, and cured, the solid three-dimensional object is heated to a temperature above 58° C. for a period of time sufficient to permit the build supports to be melted away. Because the sodium acetate trihydrate may leave a residue or film behind, the object can be subjected to an aqueous wash in water at ambient temperature.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A method for freeform fabrication of a solid three-dimensional structure, comprising:
    dispensing at least one layer of support material onto a first substrate, the support material comprising a fusible crystal hydrate;
    solidifying the at least one layer of support material;

dispensing at least one layer of build material onto a second substrate, the build material being other than water or a fusible, water-containing substance; and solidifying the at least one layer of build material.

2. The method of claim 1, wherein dispensing at least one layer of support material comprising a fusible crystal hydrate comprises dispensing at least one layer of support material comprising a fusible crystal hydrate selected from the group consisting of sodium sulfate decahydrate, sodium acetate trihydrate, sodium aluminum sulfate dodecahydrate, sodium carbonate decahydrate, sodium phosphate dodecahydrate, and potassium aluminum sulfate dodecahydrate.

3. The method of claim 1, wherein dispensing at least one layer of support material onto a first substrate comprises dispensing at least one layer of support material onto at least one of a build platform, a removable material, a previously solidified layer of build material, and a previously solidified layer of support material.

4. The method of claim 1, wherein dispensing at least one layer of support material onto a first substrate comprises dispensing at least one layer of support material from an inkjet print-head.

5. The method of claim 1, wherein dispensing at least one layer of support material onto a first substrate comprises extruding at least one layer of support material from a fused deposition modeling head.

6. The method of claim 1, wherein dispensing at least one layer of build material onto a second substrate comprises dispensing at least one layer of build material selected from the group consisting of waxes, polymers, pre-polymers and combinations thereof.

7. The method of claim 1, wherein dispensing at least one layer of build material onto a second substrate comprises dispensing at least one layer of build material onto at least one of a build platform, a removable material, a previously solidified layer of build material, and a previously solidified layer of support material.

8. The method of claim 1, wherein dispensing at least one layer of build material onto a second substrate comprises dispensing at least one layer of build material from an inkjet print-head.

9. The method of claim 1 wherein dispensing at least one layer of build material onto a second substrate comprises extruding at least one layer of build material from a fused deposition modeling head.

10. The method of claim 1, wherein dispensing at least one layer of support material onto a first substrate and dispensing at least one layer of build material onto a second substrate comprises dispensing at least one layer of support material and at least one layer of build material onto the same substrate.

11. The method of claim 1, wherein solidifying the at least one layer of support material comprises solidifying the at least one layer of support material by chemical curing, thermal curing, or exposure to a source of ultraviolet radiation.

12. The method of claim 1 , wherein solidifying the at least one layer of build material comprises solidifying the at least one layer of build material by chemical curing, thermal curing, or exposure to a source of ultraviolet radiation.

13. The method of claim 1, further comprising accruing a plurality of layers of the build material successively bound to one another to form the solid three-dimensional object.

* * * * *

UNITED STATES PATENT AND TRADEMARK OFFICE
CERTIFICATE OF CORRECTION

PATENT NO. : 7,255,825 B2 Page 1 of 1
APPLICATION NO. : 10/797789
DATED : August 14, 2007
INVENTOR(S) : Jeffrey A. Nielsen et al.

It is certified that error appears in the above-identified patent and that said Letters Patent is hereby corrected as shown below:

In column 7, line 32, delete "$(KAl(SO_4)_2 \times 12H_1 O)$" and insert -- $(KAl(SO_4)_2 \times 12H_2O)$ --, therefor.

In column 10, line 10, in Claim 9, after "claim 1" insert -- , --.

Signed and Sealed this

Fifth Day of May, 2009

JOHN DOLL
*Acting Director of the United States Patent and Trademark Office*